US010802973B1

(12) United States Patent
Ratnakaram et al.

(10) Patent No.: US 10,802,973 B1
(45) Date of Patent: Oct. 13, 2020

(54) DATA ACCESS TOOL (71) Applicant: Bank of America Corporation, Charlotte, NC (US)

(72) Inventors: Udaya Kumar Raju Ratnakaram, Hyderabad (IN); Niroop Reddy Patimeedi, Hyderabad (IN); Sarvari Tadimalla, Bhlmavaram (IN); Maruthi Shanmugam, McKinney, TX (US); Jian Jim Chen, Hockessin, DE (US); Punit Srivastava, Newark, DE (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/458,883

(22) Filed: Jul. 1, 2019

(51) Int. Cl.
  *G06F 12/084* (2016.01)
  *G06F 16/22* (2019.01)
  *G06F 12/0842* (2016.01)
  *G06F 16/27* (2019.01)

(52) U.S. Cl.
  CPC ........ *G06F 12/084* (2013.01); *G06F 12/0842* (2013.01); *G06F 16/2272* (2019.01); *G06F 16/273* (2019.01); *G06F 2212/1024* (2013.01); *G06F 2212/62* (2013.01)

(58) Field of Classification Search
  CPC .. G06F 12/084; G06F 16/273; G06F 16/2272; G06F 12/0842; G06F 2212/1024; G06F 2212/62
  USPC ......................................................... 711/130
  See application file for complete search history.

(56) References Cited

U.S. PATENT DOCUMENTS

| 4,888,681 | A | 12/1989 | Barnes |
|---|---|---|---|
| 5,150,472 | A | 9/1992 | Blank |
| 5,276,835 | A | 1/1994 | Mohan |
| 5,287,473 | A | 2/1994 | Mohan |
| 5,493,668 | A | 2/1996 | Elko |
| 5,544,345 | A | 8/1996 | Carpenter |
| 5,557,792 | A | 9/1996 | Josten |
| 5,581,734 | A | 12/1996 | DiBrino |
| 5,710,881 | A | 1/1998 | Gupta |
| 5,813,016 | A | 9/1998 | Sumimoto |
| 5,875,464 | A | 2/1999 | Kirk |
| 5,946,711 | A | 8/1999 | Donnelly |
| 5,960,461 | A | 9/1999 | Frank |
| 6,026,474 | A | 2/2000 | Carter |
| 6,078,994 | A | 6/2000 | Carey |
| 6,192,398 | B1 | 2/2001 | Hunt |
| 6,389,420 | B1 | 5/2002 | Vahalia |

(Continued)

*Primary Examiner* — Gautam Sain
(74) *Attorney, Agent, or Firm* — Michael A. Springs (57) ABSTRACT

An apparatus includes a first database, a memory, and first and second processors. The first database stores a list including a first identifier assigned to the first processor and a second identifier assigned to the second processor. The processors each randomly shuffle a copy of the list and place the first element of their shuffled copy in a third list. Each processor further determines that the first identifier appears a first number of times and the second identifier appears a second number of times in the third list, the first number greater than the second number. In response to determining that the first number is greater than the second number, the first processor copies data stored in a second database into the memory and sets a flag to true, while the second processor determines that the flag is set to true and accesses the data copy stored in the memory.

20 Claims, 5 Drawing Sheets

(56) References Cited

U.S. PATENT DOCUMENTS

| | | |
|---|---|---|
| 6,438,553 B1 | 8/2002 | Yamada |
| 6,591,347 B2 | 7/2003 | Tischler |
| 6,751,706 B2 | 6/2004 | Chauvel |
| 6,766,418 B1 | 7/2004 | Alexander |
| 6,920,529 B2 | 7/2005 | Gruner |
| 7,120,651 B2 | 10/2006 | Bamford |
| 7,475,193 B2 | 1/2009 | Hutton |
| 7,558,920 B2 | 7/2009 | Mattina |
| 7,571,285 B2 | 8/2009 | Hughes |
| 7,587,467 B2 | 9/2009 | Hesselink |
| 7,680,987 B1 | 3/2010 | Clark |
| 7,831,773 B2 | 11/2010 | Zedlewski |
| 7,831,977 B2 | 11/2010 | Shultz |
| 8,261,316 B2 | 9/2012 | Weber |
| 8,271,730 B2 | 9/2012 | Piry et al. |
| 8,732,386 B2 | 5/2014 | O'Krafka |
| 8,805,968 B2 | 8/2014 | Taylor |
| 8,818,942 B2 | 8/2014 | Escribano Bullon et al. |
| 8,904,115 B2 | 12/2014 | Chachad |
| 9,002,912 B2 | 4/2015 | Aronovich |
| 9,317,384 B2 | 4/2016 | Cen |
| 9,367,463 B2 | 6/2016 | Biswal |
| 9,767,031 B2 | 9/2017 | Antani et al. |
| 10,210,092 B1 | 2/2019 | Miao |
| 2003/0131197 A1 | 7/2003 | Morrison |
| 2018/0293237 A1* | 10/2018 | Vandiver ............... G06F 16/278 |

\* cited by examiner

DATA ACCESS TOOL

TECHNICAL FIELD

This disclosure relates generally to data processing systems and more particularly, to data access and sharing in distributed data processing systems.

BACKGROUND

Enterprises often provide applications to their customers that may be used for a variety of purposes, such as customer service, order processing, communications, and various other services that operate on data stored in the enterprises' data centers. To help efficiently deploy such applications, enterprises frequently implement multiple processors that operate simultaneously, in a clustered environment, to execute the applications. In such instances, when an application contains a component that reads a dataset from a database, each of those processors that execute this component will separately access the database to read the dataset.

SUMMARY

Enterprises often provide applications to their customers that may be used for a variety of purposes, such as customer service, order processing, communications, and various other services that operate on data stored in the enterprises' data centers. To help efficiently deploy such applications, enterprises frequently implement multiple processors that operate simultaneously, in a clustered environment, to execute the applications. In such instances, when an application contains a component that reads a dataset from a database, each of those processors that execute this component will separately access the database to read the dataset.

Repeated access to a back-end database by multiple processors (such as the access that may occur when multiple processors execute the same database-accessing component of an application in parallel), however, may lead to processing bottlenecks, negatively impacting any of the performance gains achieved by executing the application in a clustered environment. For example, when multiple processors attempt to access the same database at the same time, this will increase the load on the database's servers and potentially consume a large proportion of database's server resources. This, in turn, may lead to database request failures and timeouts.

This disclosure contemplates a data access tool that addresses one or more of the above issues. The tool enables a set of processors to cooperate with one another when executing an application that uses data from a back-end database, such that only one processor actually accesses the database to retrieve the data while the other processors obtain the data from a faster to access, distributed cache. In certain embodiments, this may reduce the load on the database and help to prevent database request failures and timeouts. The tool provides for the selection of a master processor from the set of processors, which is then responsible for retrieving data from the back-end database and writing this data to the distributed cache. The remaining slave processors wait for the master processor to finish writing the data to the cache, before accessing the cache to obtain the data. This disclosure contemplates that the selection of the master processor is a dynamic process, which may occur multiple times throughout the execution of an application, such that the processors of the set of processors take turns sharing the database access role. Additionally, this tool allows new processors to be added dynamically to the system, without disturbing the existing processor infrastructure or impacting any of the running applications. Certain embodiments of the data access tool are described below.

According to one embodiment, an apparatus includes a first database, a second database, a first memory, a second memory, a third memory, a first hardware processor, and a second hardware processor. The first database stores a first list of identifiers and a flag. The first list of identifiers includes a first identifier and a second identifier. The second database stores a dataset. The first hardware processor is assigned to the first identifier and is communicatively coupled to the first memory and the second memory. The second hardware processor is assigned to the second identifier and is communicatively coupled to the first memory and the third memory. The first processor copies the first list of identifiers from the first database into a second list of identifiers. The first processor further stores the second list of identifiers in the second memory. The first processor additionally uses a first random number to shuffle the second list of identifiers. In response to shuffling the second list of identifiers, the first processor determines a first entry of the second list of identifiers. The first entry includes an identifier of the first list of identifiers. The first processor next stores the first entry of the second list in a third list. The third list is stored in the first database. The first processor further determines that a time interval has passed. In response to determining that the time interval has passed, the first processor accesses the third list. The first processor additionally determines that the first identifier appears a first number of times in the third list. The first processor also determines that the second identifier appears a second number of times in the third list. The first processor then determines that the first number is greater than the second number. In response to determining that the first number is greater than the second number, the first processor copies the dataset into a dataset copy and stores the dataset copy in the first memory. In response to storing the dataset copy in the first memory, the first processor sets a value for the flag to true. The second hardware processor copies the first list of identifiers from the first database into a fourth list of identifiers. The second hardware processor then stores the fourth list of identifiers in the third memory. The second processor further uses a second random number to shuffle the fourth list of identifiers. In response to shuffling the fourth list of identifiers, the second processor determines a first entry of the fourth list of identifiers. The first entry of the fourth list includes an identifier of the first list of identifiers. The second processor further stores the first entry of the fourth list in the third list. The third list is stored in the first database. The second processor additionally determines that the time interval has passed. In response to determining that the time interval has passed, the second processor accesses the third list. The second processor additionally determines that the first identifier appears the first number of times in the third list. The second processor also determines that the second identifier appears the second number of times in the third list. The second processor further determines that the first number is greater than the second number. In response to determining that the first number is greater than the second number, the second processor determines that the value for the flag is set to true. In response to determining that the value for the flag is set to true, the second processor accesses the dataset copy stored in the first memory.

According to another embodiment, a method includes performing a first sub-method using a first hardware processor and performing a second sub-method using a second hardware processor. The first sub-method includes copying a first list of identifiers from a first database into a second list of identifiers. The first list of identifiers includes a first identifier assigned to the first hardware processor and a second identifier assigned to a second hardware processor. The first sub-method also includes storing the second list of identifiers in a second memory. Here, the first processor is communicatively coupled to the second memory and to a first memory. The first sub-method additionally includes using a first random number to shuffle the second list of identifiers. In response to shuffling the second list of identifiers, the first sub-method includes determining a first entry of the second list of identifiers. The first entry includes an identifier of the first list of identifiers. The first sub-method also includes storing the first entry of the second list of identifiers in a third list. The third list is stored in the first database. The first sub-method further includes determining that a time interval has passed. In response to determining that the time interval has passed, the first sub-method includes accessing the third list. The first sub-method also includes determining that the first identifier appears a first number of times in the third list. The first sub-method additionally includes determining that the second identifier appears a second number of times in the third list. The first sub-method further includes determining that the first number is greater than the second number. In response to determining that the first number is greater than the second number, the first sub-method includes copying the dataset into a dataset copy. The first sub-method also includes storing the dataset copy in the first memory. In response to storing the dataset copy in the first memory, the first sub-method includes setting a value for a flag to true. The flag is stored in the first database. The second sub-method includes copying the first list of identifiers from the first database into a fourth list of identifiers. The second sub-method also includes storing the fourth list of identifiers in a third memory. Here, the second processor is communicatively coupled to the first memory and the third memory. The second sub-method also includes using a second random number to shuffle the fourth list of identifiers. In response to shuffling the fourth list of identifiers, the second sub-method includes determining a first entry of the fourth list of identifiers. The first entry of the fourth list includes an identifier of the first list of identifiers. The second sub-method further includes storing the first entry of the fourth list in the third list. The third list is stored in the first database. The second sub-method also includes determining that the time interval has passed. In response to determining that the time interval has passed, the second sub-method includes accessing the third list. The second sub-method further includes determining that the first identifier appears the first number of times in the third list. The second sub-method additionally includes determining that the second identifier appears the second number of times in the third list. The second sub-method additionally includes determining that the first number is greater than the second number. In response to determining that the first number is greater than the second number, the second sub-method includes determining that the value for the flag is set to true. In response to determining that the value for the flag is set to true, the second sub-method includes accessing the dataset copy stored in the first memory.

According to a further embodiment, a system includes a first storage element, a second storage element, a third storage element, a fourth storage element, a fifth storage element, a first processing element, and a second processing element. The first storage element is operable to store a first list of identifiers and a flag. The first list of identifiers includes a first identifier and a second identifier. The second storage element is operable to store a dataset. The third storage element includes a distributed cache. The first processing element is assigned to the first identifier and is communicatively coupled to the third storage element and the fourth storage element. The second processing element is assigned to the second identifier and is communicatively coupled to the third storage element and the fifth storage element. The first processing element is operable to copy the first list of identifiers from the first storage element into a second list of identifiers. The first processing element is also operable to store the second list of identifiers in the fourth storage element. The first processing element is additionally operable to use a first random number to shuffle the second list of identifiers. In response to shuffling the second list of identifiers, the first processing element is operable to determine a first entry of the second list of identifiers. The first entry includes an identifier of the first list of identifiers. The first processing element is also operable to store the first entry of the second list in a third list. The third list is stored in the first storage element. The first processing element is further operable to determine that a time interval has passed. In response to determining that the time interval has passed, the first processing element is operable to access the third list. The first processing element is also operable to determine that the first identifier appears a first number of times in the third list. The first processing element is additionally operable to determine that the second identifier appears a second number of times in the third list. The first processing element is further operable to determine that the first number is greater than the second number. In response to determining that the first number is greater than the second number, the first processing element is operable to copy the dataset into a dataset copy. The first processing element is additionally operable to store the dataset copy in the third storage element. In response to storing the dataset copy in the third storage element, the first processing element is operable to set a value for the flag to true. The second processing element is operable to copy the first list of identifiers from the first storage element into a fourth list of identifiers. The second processing element is also operable to store the fourth list of identifiers in the fifth storage element. The second processing element is additionally operable to use a second random number to shuffle the fourth list of identifiers. In response to shuffling the fourth list of identifiers, the second processing element is operable to determine a first entry of the fourth list of identifiers. The first entry of the fourth list includes an identifier of the first list of identifiers. The second processing element is also operable to store the first entry of the fourth list in the third list. The third list is stored in the first storage element. The second processing element is operable to determine that the time interval has passed. In response to determining that the time interval has passed, the second processing element is operable to access the third list. The second processing element is also operable to determine that the first identifier appears the first number of times in the third list. The second processing element is additionally operable to determine that the second identifier appears the second number of times in the third list. The second processing element is further operable to determine that the first number is greater than the second number. In response to determining that the first number is greater than the second number, the second processing element is operable to determine that the value for the flag is set to true. In response to determining that the value for the flag is set to true, the second processing element is operable to access the dataset copy stored in the third storage element.

Certain embodiments provide one or more technical advantages. For example, an embodiment reduces the load on a back-end database server system and conserves database server resources by reducing the number of interactions with the database. As another example, an embodiment reduces the chances for database request failures and timeouts. As a further example, an embodiment enables additional processors to be added dynamically to a cluster that is executing applications, without disturbing the existing cluster infrastructure or impacting any running applications. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 5 of the drawings, like numerals being used for like and corresponding parts of the various drawings.

Enterprises often provide applications to their customers that may be used for a variety of purposes, such as customer service, order processing, communications, and various other services that operate on data stored in the enterprises' data centers. To help efficiently deploy such applications, enterprises frequently implement multiple processors that operate simultaneously, in a clustered environment, to execute the applications. In such instances, when an application contains a component that reads a dataset from a database, each of those processors that execute this component will separately access the database to read the dataset.

Repeated access to a back-end database by multiple processors (such as the access that may occur when multiple processors execute the same database-accessing component of an application in parallel), however, may lead to processing bottlenecks, negatively impacting any of the performance gains achieved by executing the application in a clustered environment. For example, when multiple processors attempt to access the same database at the same time, this will increase the load on the database's servers and potentially consume a large proportion of database's server resources. This, in turn, may lead to database request failures and timeouts.

This disclosure contemplates a data access tool that addresses one or more of the above issues. The tool enables a set of processors to cooperate with one another when executing an application that uses data from a back-end database, such that only one processor actually accesses the database to retrieve the data while the other processors obtain the data from a faster to access, distributed cache. In certain embodiments, this may reduce the load on the database and help to prevent database request failures and timeouts. The tool provides for the selection of a master processor from the set of processors, which is then responsible for retrieving data from the back-end database and writing this data to the distributed cache. The remaining slave processors wait for the master processor to finish writing the data to the cache, before accessing the cache to obtain the data. This disclosure contemplates that the selection of the master processor is a dynamic process, which may occur multiple times throughout the execution of an application, such that the processors of the set of processors take turns sharing the database access role. Additionally, this tool allows new processors to be added dynamically to the system, without disturbing the existing processor infrastructure or impacting any of the running applications. The data access tool will be described in more detail using FIGS. 1 through 5.

Figure 1:
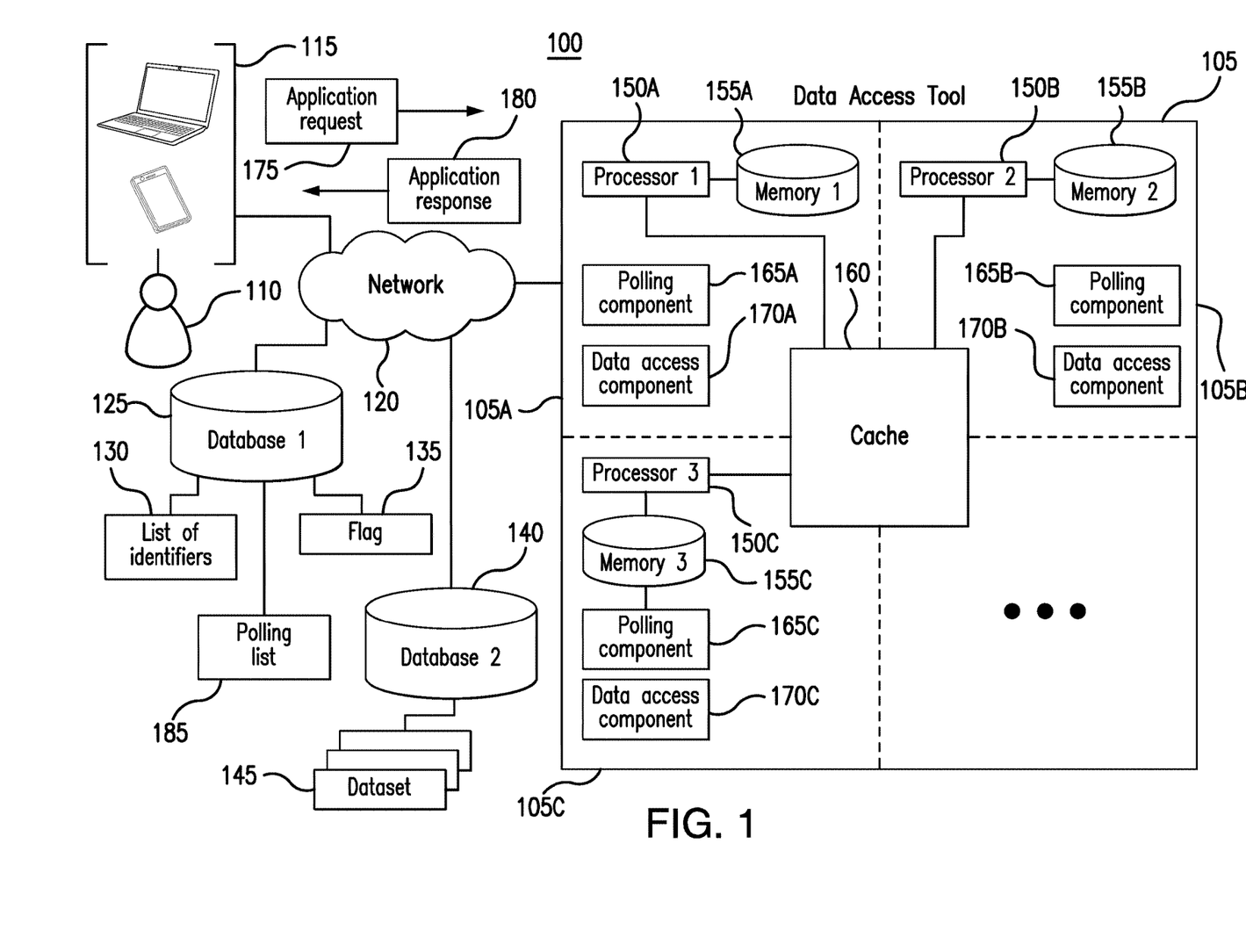
FIG. 1 illustrates an example system.

FIG. 1 illustrates an example system 100. As seen in FIG. 1, system 100 includes data access tool 105, one or more devices 115, network 120, first database 125, and second database 140. Generally, data access tool 105 enables cooperation among a cluster of processors 150 that are executing applications that operate on dataset 145 stored in second database 140. Rather than each processor 150 individually accessing second database 140 to obtain dataset 145, data access tool 105 enables the set of processors 150 to select a master processor 150 that will access second database 140 and store dataset 145 in a distributed cache 160 for access by the other processors 150. In this manner, certain embodiments of data access tool 105 help to conserve CPU processing time for processors 150 as well as help to reduce the load on second database 140, thereby reducing the likelihood of database request timeouts and failures.

Devices 115 are used by users 110 to send application requests 175 to data access tool 105 and to receive application responses 180 from data access tool 105. Application requests 175 may include requests to data access tool 105 to execute a given application that operates on dataset 145 stored in second database 140. Application responses 180 may include the results of executing the given application. In certain embodiments, devices 115 may communicate with database tool 105 through network 120 via a web interface.

Devices 115 include any appropriate device for communicating with components of system 100 over network 120. For example, devices 115 may be a telephone, a mobile phone, a computer, a laptop, a tablet, a server and/or an automated assistant. This disclosure contemplates devices 115 being any appropriate device for sending and receiving communications over network 120. As an example, and not by way of limitation, device 115 may be a computer, a laptop, a wireless or cellular telephone, an electronic notebook, a personal digital assistant, a tablet, or any other device capable of receiving, processing, storing, and/or communicating information with other components of system 100. Device 115 may also include a user interface, such as a display, a microphone, keypad, or other appropriate terminal equipment usable by user 110. In some embodiments, an application executed by device 115 may perform the functions described herein.

Network 120 facilitates communication between and amongst the various components of system 100. This disclosure contemplates network 120 being any suitable network operable to facilitate communication between the components of system 100. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

First database 125 stores a list of identifiers 130, a flag 135, and a polling list 185. The list of identifiers 130 contains identifiers assigned to each of the processors 150A through 150C belonging to system 100. In certain embodiments, the list of identifiers 130 is generated by data access tool 105 during an initialization process of data access tool 105. For example, in certain embodiments, each of processors 150A through 150C may access first database 125 and store an identifier assigned to it in the list of identifiers 130 during initialization. In other embodiments, the list of identifiers 130 is created by a system administrator. This disclosure contemplates that the identifier assigned to a processor 150 is any number suitable to distinguish between the processors 150A through 150C of data access tool 105. For example, in certain embodiments, the identifier assigned to a processor 150 is an IP address of the processor.

In certain embodiments, the list of identifiers 130 is static, such that after the initialization process of data access tool 105, the list of identifiers 130 does not change. In other embodiments, the list of identifiers 130 is dynamic, such that after the initialization process of data access tool 105 the list of identifiers 130 may change, as additional processors are added to system 100 or existing processors are removed. This disclosure contemplates that an existing processor may be removed from the list of identifiers 130 not only when the processor is removed from system 100, but also simply when it may be desirable to prevent the processor from being chosen as the master processor, responsible for accessing second database 140 and writing data to cache 160. Such situations may occur when a processor 150A is experiencing high loads such that accessing second database 140 and writing to cache 160 may take significantly longer for the processor 150A than for any of the remaining processors 150B or 150C that are experiencing lower loads. In such situations, removing processor 150A from the list of identifiers 130 may improve the processing time of data access tool 105.

Flag 135 is used by data access tool 105 to indicate whether cache 160 contains data available for access by the slave processors. Flag 135 is initially set to a value indicating that cache 160 does not yet contain data available for access by the slave processors. For example, flag 135 may be set to FALSE, 0, or any other appropriate value indicating that cache 160 does not yet contain available data. After the master processor has finished storing data in cache 160, the master processor will update the value of flag 135 to indicate that cache 160 contains data available for access by the slave processors. For example, the master processor may set flag 135 to TRUE, 1, or any other appropriate value indicating that cache 160 contains available data. When executing an application that operates on dataset 145 stored in second database 140, the master processor may update the value for flag 135 multiple times. For example, consider a database sharing tool 105 in which first processor 150A is the master processor, while second processor 150B and third processor 150C are the slave processors. Consider also an application that includes a first component, a second component designed to operate on a first dataset 145 stored in second database 140, and a third component designed to operate on a second dataset 145 stored in second database 140. Processors 150A through 150C may cooperatively execute the first component of the application. Upon reaching the second component of the application, master processor 150A may access second database 140 and copy the first dataset 145 into cache 160, while the slave processors 150B and 150C wait for the master processor 150A to finish this copying process. When the master processor 150A has finished copying dataset 145 into cache 160, master processor 150A may set the value for flag 135 to TRUE. In response to determining that the value for flag 135 is set to TRUE, slave processors 150B and 150C may execute the second component of the application, which involves accessing first dataset 145 stored in cache 160. Upon reaching the third component of the application, master process 150A may set the value for the flag 135 to FALSE, given that the third component of the application operates on data that the master processor 150A has not yet copies into cache 160. Master processor 150A may then access second database 140 and copy the second dataset 145 into cache 160, while the slave processors 150B and 150C wait. When the master processor 150A has finished copying the second dataset 145 into cache 160, master processor 150A may set the value for flag 135 to TRUE. In response to determining that the value for flag 135 is set to TRUE, slave processors 150B and 150C may execute the third component of the application, which involves accessing second dataset 145 stored in cache 160. In this manner, flag 135 acts as a means through which master processor 150A may communicate the availability of data it has copied into cache 160 to the slave processors 150B and 150C.

Polling list 185 contains a list of votes for the master processor, wherein each vote consists of a processor identifier of the list of identifiers 130. Each of the processors 150A through 150C stores a vote for the master processor in polling list 185. The processor whose identifier appears the greatest number of times in polling list 185 will be selected by data access tool 105 as the master processor. In certain embodiments, polling list 185 is updated a single time during an initialization process of data access tool 105. In other embodiments, polling list 185 is updated at regular intervals throughout the operation of data access tool 105. In further embodiments, polling list 185 is updated each time an application request 175 is submitted to data access tool 105.

Second database 140 stores the data 145 on which data access tool 105 operates. In certain embodiments, second database 140 may be a back-end database, such that users 110 access the data stored in database 140 indirectly, through an external application, rather than through application logic stored within the database itself. This disclosure contemplates that second database 140 is configured such that the time it takes a processor 150 to read a piece of data from second database 140 is greater than the time it takes the processor 150 to read the same piece of data from cache 160.

As seen in FIG. 1, data access tool 105 can be split into two or more components 105A through 105C, each containing a processor and a memory, each coupled to cache 160, and each configured to perform a similar set of functions.

Generally, each component 105A through 105C of database tool 105 implements polling component 165 and data access component 170.

Each processor 150A through 150C uses polling component 165 to cast a vote for which of processors 150A through 150C data access tool 105 should select as the master processor, responsible for accessing database 140 and copying dataset 145 into cache 160 for access by the remaining processors. For simplicity, an example of the operation of polling component 165A of component 105A of data access tool 105 will be presented below. It should be understood that polling components 165B and 165C (along with any other polling components that may be present in systems containing more than 3 processors 150) behavior in a similar manner.

Polling component 165A accesses the list of identifiers 130 stored in first database 125 and stores a copy of the list in first memory 155A. The list of identifiers 130 contains an identifier assigned to each of processors 150A through 150C. Polling component 165A shuffles the copy of the list of identifiers, selects the first element of the shuffled list, and stores this first element in polling list 185 in first database 125. This first element will be an identifier assigned to one of processors 150A through 150C and represents first processor 150A's vote for the master processor.

In certain embodiments, shuffling the copy of the list of identifiers includes obtaining one or more random numbers from a random number generator and using the one or more random numbers to shuffle the copy of the list. This disclosure contemplates the use of any appropriate shuffling method to shuffle the copy of the list, wherein the shuffling method is based on the use of one or more random numbers. For example, in certain embodiments, a Fisher-Yates shuffle algorithm is implemented to shuffle the copy of the list. In certain other embodiments, a random number is assigned to each element of the copy of the list, and the elements of the copy are re-ordered by arranging the elements according to their assigned random numbers.

In certain embodiments, the random number generator chosen to generate the one or more random numbers is a pseudo random number generator. This disclosure contemplates the use of any appropriate random number generator designed to produce a random number (pseudo-random or otherwise). For example, in certain embodiments, the random number generator is a linear congruential generator. In other embodiments, the random number generator is a Middle Square Weyl Sequence generator. In further embodiments, the random number generator is a Mersenne Twister random number generator.

This disclosure contemplates that the value chosen for the seed provided to the random number generator is different for each of polling components 165A through 165C, such that no two polling components 165A through 165C produce the same sequence of random numbers. For example, in certain embodiments, the seed for the random number generator is chosen as the current system time plus the identifier assigned to the processor executing the polling component 165.

In certain embodiments, processors 150A through 150C use polling components 165 to vote for a master processor during initialization of data access tool 105. In certain embodiments, processors 150A through 150C use polling components 165 to vote for a new master processor each time an application request 175 is received by data access tool 105. In other embodiments, processors 150A through 150C use polling components 165 to vote for a new master processor at regular time intervals throughout the operation of data access tool 105. In certain embodiments, the size of the time intervals is set by a system administrator.

Using polling components 165 to vote for a new master processor at regular time intervals may be desirable in order to share the database access role amongst processors 150A through 150C during the execution of an application, as this may avoid straining the processing resources of any given processor 150A through 150C. For example, a processor 150A may experience near capacity loads while executing an application. Accordingly, this processor may remove its identifier from the list of identifiers 130, such that there is no possibility for processor 150A to be chosen as the master processor during the next time interval.

Using polling components 165 to vote for a new master processor at regular time intervals may also be desirable in embodiments in which additional processing resources may be added to system 100 during the execution of an application. This disclosure contemplates that in such embodiments, any type of processor—including external nodes, servers, hosts, and/or cloud-based servers—may be added to system 100, by adding an identifier assigned to the processor to the list of identifiers 130. In such embodiments, voting for a new master processor during the execution of an application may enable a new processor, such as a cloud-based server which was not part of system 100 at the start of the execution of the application, to assume the role of master processor, without interrupting any of the existing processors 150A through 150C or impacting any applications that are running.

Polling component 165 may be a software module stored in a memory 140 and executed by a processor 150. An example algorithm for polling component 165 is as follows: access first database 125; copy list of identifiers 130 into a copy of the list of identifiers; store the copy of the list of identifiers in memory 155; determine the number of entries in the list of identifiers 130; use a random number generator to obtain a set of random numbers, the set of random numbers containing the same number of random numbers as the number of entries in the list of identifiers 130; assign each of the random numbers in the set of random numbers to an identifier in the copy of the list of identifiers 130; reorder the entries in the list of identifiers by reordering the random numbers assigned to the identifiers from smallest to largest; store the first element of the reordered copy of the list of identifiers in polling list 185 in first database 125.

Data access components 170A through 170C of data access tool 105 are used by processors 150A through 150C to determine from which location—second database 140 or cache 160—each processor should read the data used by an application executed by the processors. For simplicity, an example of the operation of data access component 170A of component 105A of data access tool 105 will be presented below. It should be understood that data access components 170B and 170C (along with any other data access components that may be present in systems containing more than 3 processors 150) behavior in a similar manner.

Data access component 170A uses polling list 185 stored in first database 125 to determine whether first processor 150A is the master processor or a slave processor. To determine whether first processor 150A is the master processor or a slave processor, data access component 170A determines the number of times the identifier assigned to first processor 150A appears in polling list 185. If the identifier assigned to first processor 150A appears more times in polling list 185 than any other identifier, data access component 170A determines that first processor 150A is the master processor. If the identifier assigned to first processor 150A appears fewer times than one or more other identifiers, data access component 170A determines that first processor 150A is a slave processor. In certain embodiments, if data access component 170A determines that the identifier assigned to first processor 150A appears the same number of times as one or more other identifiers and that no further identifier appears a greater number of times than the identifier assigned to first processor 150A, data access component 170A additionally determines whether the identifier assigned to first processor 150A is located before the one or more identifiers in the list of identifiers 130. If data access component 170A determines that the identifier assigned to first processor 150A is located before the one or more identifiers in the list of identifiers 130, data access component 170A determines that first processor 150A is the master processor. If data access component 170A determines that the identifier assigned to first processor 150A is not located before the one or more identifiers in the list of identifiers 130, data access component 170A determines that first processor 170A is a slave processor.

In certain embodiments, data access component 170A first determines that a set time interval has passed since processor 150A invoked polling component 165A, prior to accessing polling list 185. This helps to ensure that all of the processors 150A through 150C have cast their votes for the master processor (by storing an identifier assigned to one of the processors 150A through 150C in polling list 185) before data access component 170A accesses polling list 185 to determine the results of the voting process.

If data access component 170A determines that first processor is the master processor, data access component 170A next accesses second database 140 and copies dataset 145 to cache 160 for access by the slave processors. In certain embodiments, data access component 170A accesses second database 140 directly. In other embodiments, data access component 170A accesses second database 140 by invoking a back-end application to access second database 140. Once data access component 170A has finished copying dataset 145 to cache 160, data access component 170A updates the value for flag 135 to indicate that cache 160 is ready for access by the slave processors. In certain embodiments, data access component 170A updates the value for flag 135 to TRUE, 1, or any other value indicating that the slave processors may access cache 160. In certain embodiments, in addition to updating the value for flag 135, the master processor also broadcasts a message to the slave processors indicating that the value for flag 135 has been updated.

If data access component 170A determines that first processor is a slave processor, data access component 170A next waits for the master processor to finish updating cache 160. In certain embodiments, waiting for the master processor to finish updating cache 160 includes accessing first database 125 and monitoring the value for flag 135. In certain embodiments, monitoring the value for flag 135 includes accessing first database 125 and determining the value for flag 135 at regular intervals, until data access component 170A determines that the value for flag 135 has changed from FALSE to TRUE, 0 to 1, or any other appropriate change, indicating that the master processor has finished updating cache 160. In other embodiments, waiting for the master processor to finish updating cache 160 includes waiting to receive a message, broadcasted to the slave processor from the master processor, indicating that the master processor has updated the value for flag 135 to indicate that cache 160 is ready for access by the slave processors. Once data access component 170A determines that the master processor has finished updating cache 160, data access component 170A accesses the data copied by the master processor from second database 140 to cache 160.

In certain embodiments, an application executed by processors 150A through 150C may contain different application components that each operate on different datasets 145 of second database 140. In such embodiments, processors 150A through 150C may execute data access components 170A through 170C multiple times during the execution of the application, each time either copying a different dataset 145 to cache 160, if the master processor, or waiting while the master processor copies the different dataset 145 to cache 160 and then reading the different dataset 145 from cache 160, upon determining that the master processor has finished updating cache 160, if one of the slave processors.

Data access component 170 may be a software module stored in memory 155 and executed by processor 150. An example algorithm for data access component 170 assigned to a processor 150 is as follows: determine that a time interval has passed; access polling list 185; determine the number of times the identifier assigned to the processor 150 appears in polling list 185; determine if a different identifier appears a greater number of times in polling list 185 than the identifier assigned to the processor; if a different identifier appears a greater number of times in polling list 185 than the identifier assigned to the processor: {monitor the value for flag 135 stored in first database 125; if the value for flag 135 is set to TRUE: read data from cache 160}; if a different identifier does not appear a greater number of times in polling list 185 than the identifier assigned to the processor: {determine if one or more other identifiers appear the same number of times in polling list 185 as the identifier assigned to the processor; if one or more identifiers appear the same number of times in polling list 185 as the identifier assigned to the processor: {determine whether the identifier assigned to the processor is located above the one or more other identifiers in the list of identifiers 130; if the identifier assigned to the processor is located above the one or more other identifiers in the list of identifiers 130: {access dataset 145 stored in second database 140; copy dataset 145 into cache 160; set the value for flag 135 to TRUE}; if the identifier assigned to the processor is not located above the one or more other identifiers in the list of identifiers 130: {monitor the value for flag 135 stored in first database 125; if the value for flag 135 is set to TRUE: read data from cache 160}}; if one or more identifiers do not appear the same number of times in polling list 185 as the identifier assigned to the processor: {access dataset 145 stored in second database 140; copy dataset 145 into cache 160; set the value for flag 135 to TRUE}}.

First processor 150A is any electronic circuitry, including, but not limited to microprocessors, application specific integrated circuits (ASIC), application specific instruction set processor (ASIP), and/or state machines, that communicatively couples to first memory 155A and cache 160 and controls the operation of first component 105A of data access tool 105. Second processor 150B is any electronic circuitry, including, but not limited to microprocessors, application specific integrated circuits (ASIC), application specific instruction set processor (ASIP), and/or state machines, that communicatively couples to second memory 155B and cache 160 and controls the operation of second component 105B of data access tool 105. Third processor 150C is any electronic circuitry, including, but not limited to microprocessors, application specific integrated circuits (ASIC), application specific instruction set processor (ASIP), and/or state machines, that communicatively couples to third memory 155C and cache 160 and controls the operation of third component 105C of data access tool 105. While FIG. 1 illustrates a data access tool 105 containing three components 105A through 105C (each component containing its own processor and memory), this disclosure contemplates the use of any number of two or more components 105A through 105C (each component containing its own processor and memory).

Processors 150A through 150C may be 8-bit, 16-bit, 32-bit, 64-bit or of any other suitable architecture. Processors 150A through 150C may each include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processors 150A through 150C may each include other hardware and software that operates to control and process information.

First processor 150A executes software stored on first memory 155A to perform any of the functions described herein. First processor 150A controls the operation and administration of first component 105A of data access tool 105 by processing information received from network 120, device(s) 115, and first memory 155A. First processor 150A may be a programmable logic device, a microcontroller, a microprocessor, any suitable processing device, or any suitable combination of the preceding. First processor 150A is not limited to a single processing device and may encompass multiple processing devices. Second processor 150B executes software stored on second memory 155B to perform any of the functions described herein. Second processor 150B controls the operation and administration of second component 105B of data access tool 105 by processing information received from network 120, device(s) 115, and second memory 155B. Second processor 150B may be a programmable logic device, a microcontroller, a microprocessor, any suitable processing device, or any suitable combination of the preceding. Second processor 150B is not limited to a single processing device and may encompass multiple processing devices. Third processor 150C executes software stored on third memory 155C to perform any of the functions described herein. Third processor 150C controls the operation and administration of third component 105C of data access tool 105 by processing information received from network 120, device(s) 115, and third memory 155C. Third processor 150C may be a programmable logic device, a microcontroller, a microprocessor, any suitable processing device, or any suitable combination of the preceding. Third processor 150C is not limited to a single processing device and may encompass multiple processing devices.

In certain embodiments, processors 150A through 150C include external processors, servers, hosts, and/or cloud-based servers. In certain embodiments, an additional processor may be added to system 100 by adding an identifier assigned to the processor to the list of identifiers 130. In such embodiments, this disclosure contemplates that the additional processors may be added to system 100 without disturbing the existing processor infrastructure or impacting any of the running applications.

First memory 155A may store, either permanently or temporarily, data, operational software, or other information for first processor 150A. First memory 155A may include any one or a combination of volatile or non-volatile local or remote devices suitable for storing information. For example, first memory 155A may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in first memory 155A, a disk, a CD, or a flash drive. In particular embodiments, the software may include an application executable by first processor 150A to perform one or more of the functions described herein.

Second memory 155B may store, either permanently or temporarily, data, operational software, or other information for second processor 150B. Second memory 155B may include any one or a combination of volatile or non-volatile local or remote devices suitable for storing information. For example, second memory 155B may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in second memory 155B, a disk, a CD, or a flash drive. In particular embodiments, the software may include an application executable by second processor 150B to perform one or more of the functions described herein.

Third memory 155C may store, either permanently or temporarily, data, operational software, or other information for third processor 150C. Third memory 155C may include any one or a combination of volatile or non-volatile local or remote devices suitable for storing information. For example, third memory 155C may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in third memory 155C, a disk, a CD, or a flash drive. In particular embodiments, the software may include an application executable by third processor 150C to perform one or more of the functions described herein.

Cache 160 stores datasets 145 copied from second database 140 by a master processor for easy access by the slave processors. Cache 160 may include any one or a combination of volatile or non-volatile local or remote devices suitable for storing information. In certain embodiments, cache 160 may be a fast access buffer. For example, cache 160 may include static random access memory (SRAM), dynamic random access memory (DRAM), or any other suitable fast access storage device or a combination of these devices. In certain embodiments, cache 160 may be a single cache server. In other embodiments, cache 160 may be a distributed cache, consisting of a plurality of cache servers arranged in a distributed fashion and connected to one another by network 120, together with a control server for controlling these multiple cache servers. In certain embodiments, multiple copies of information may be stored in distributed cache 160, by storing copies of the information in multiple of the cache servers.

In certain embodiments, data access tool 105 enables a set of processors 150A through 150C to cooperate with one another when executing an application that operates on a dataset 145 stored on a second database 140, such that only one processor actually accesses second database 140, while the remaining processors obtain dataset 145 from a faster to access cache memory 160. In certain embodiments, this may reduce the load on second database 140 and help to prevent database request failures and timeouts.

Figure 2:
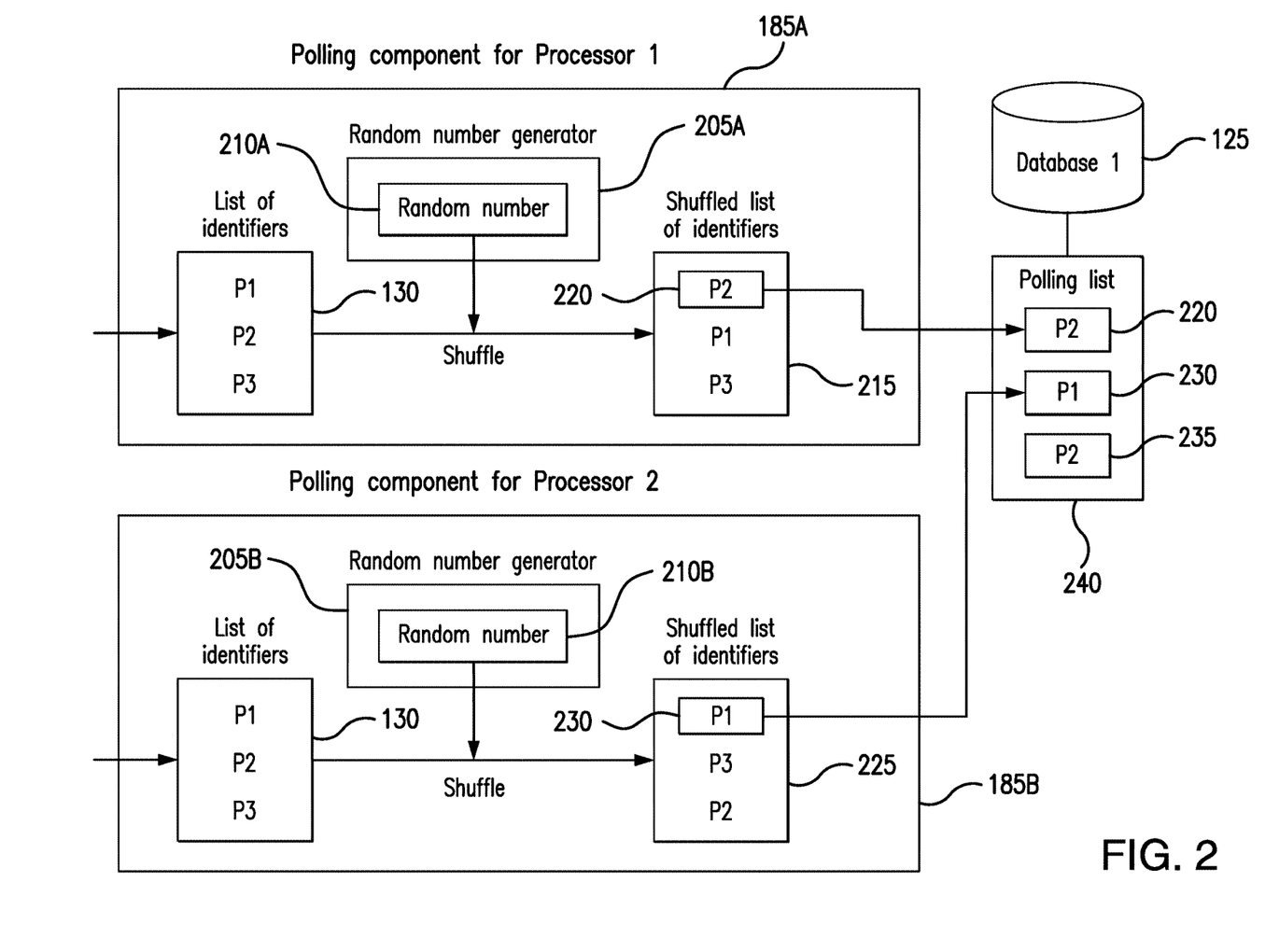
FIG. 2 illustrates the polling component of the data access tool of the system of FIG. 1.

FIG. 2 presents an example illustrating the operation of polling components 165A and 165B of data access tool 105. While, for simplicity, FIG. 2 omits the operation of polling component 165C, this disclosure contemplates that polling component 165C operates in a similar manner to polling components 165A and 165B. Additionally, this disclosure contemplates that any number of additional polling components may be included in system 100, with each additional polling component operating in a similar manner to polling components 165A and 165B.

As can be seen in FIG. 2, polling component 165A of first component 105A of data access tool 105 copies the list of identifiers 130 stored in first database 125 into first memory 155A. Polling component 165A then uses random number generator 205A to generate one or more random numbers 210A, which it then uses to shuffle the copy of the list of identifiers 130.

This disclosure contemplates the use of any appropriate shuffling method, based on the use of one or more random numbers, to shuffle the copy of the list of identifiers 130. For example, in certain embodiments, a Fisher-Yates shuffle algorithm is implemented to shuffle the copy of the list. In certain other embodiments, a random number is assigned to each element of the copy of the list, and the elements of the copy are re-ordered by arranging the elements according to their assigned random numbers.

In certain embodiments, the random number generator chosen to generate the one or more random numbers is a pseudo random number generator. This disclosure contemplates the use of any appropriate random number generator designed to produce a random number (pseudo-random or otherwise). For example, in certain embodiments, the random number generator is a linear congruential generator. In other embodiments, the random number generator is a Middle Square Weyl Sequence generator. In further embodiments, the random number generator is a Mersenne Twister random number generator.

This disclosure contemplates that the value chosen for the seed provided to the random number generator is different for each of polling components 165A through 165C, such that no two polling components 165A through 165C produce the same sequence of random numbers. For example, in certain embodiments, the seed for the random number generator is chosen as the current system time plus the identifier assigned to the processor executing the polling component 165.

Shuffling the copy of the list of identifiers 130 results in shuffled list of identifiers 215, which contains a first element 220. Polling component 165A stores first element 220 in polling list 185, as first component 105A's vote for the master processor. In this example, first element 220 contains the identifier, P2, assigned to second processor 150B.

In a similar manner as polling component 165A, polling component 165B of second component 105B of data access tool 105 copies the list of identifiers 130 stored in first database 125 into second memory 155B. Polling component 165B then uses random number generator 205B to generate one or more random numbers 210B, which it then uses to shuffle the copy of the list of identifiers 130, forming shuffled list of identifiers 225. Polling component 165B then stores first element 230 of shuffled list of identifiers 225 in polling list 185, as second component 105B's vote for the master processor. In this example, first element 230 contains the identifier, P1, assigned to first processor 150A. Third polling component 165C of third component 105C of data access tool 105 stores element 235 in polling list 185, in a similar manner. In this example, third element 235 contains the identifier, P2, assigned to second processor 150B. As can be seen, the resulting polling list 240 contains two copies of identifier P2, assigned to second processor 150B, and one copy of identifier P1, assigned to first processor 150A. Accordingly, data access components 170A through 170C will determine that first processors 150A and 150C are slave processors in this example, while second processor 150B is the master processor. This determination will be described in further detail below, in the discussion of FIG. 3.

In certain embodiments, processors 150A through 150C use polling components 165 to vote for a master processor during initialization of data access tool 105. In certain embodiments, processors 150A through 150C use polling components 165 to vote for a new master processor each time an application request 175 is received by data access tool 105. In other embodiments, processors 150A through 150C use polling components 165 to vote for a new master processor at regular time intervals throughout the operation of data access tool 105. In certain embodiments, the size of the time intervals is set by a system administrator.

Using polling components 165 to vote for a new master processor at regular time intervals may be desirable in order to share the database access role amongst processors 150A through 150C during the execution of an application, as this may avoid straining the processing resources of any given processor 150A through 150C. For example, a processor 150A may experience near capacity loads while executing an application. Accordingly, this processor may remove its identifier from the list of identifiers 130, such that there is no possibility for processor 150A to be chosen as the master processor during the next time interval.

Using polling components 165 to vote for a new master processor at regular time intervals may also be desirable in embodiments in which additional processing resources may be added to system 100 during the execution of an application. This disclosure contemplates that in such embodiments, any type of processor—including external nodes, servers, hosts, and/or cloud-based servers—may be added to system 100, by adding an identifier assigned to the processor to the list of identifiers 130. In such embodiments, voting for a new master processor during the execution of an application may enable a new processor, such as a cloud-based server which was not part of system 100 at the start of the execution of the application, to assume the role of master processor, without interrupting any of the existing processors 150A through 150C or impacting any running applications.

Figure 3:
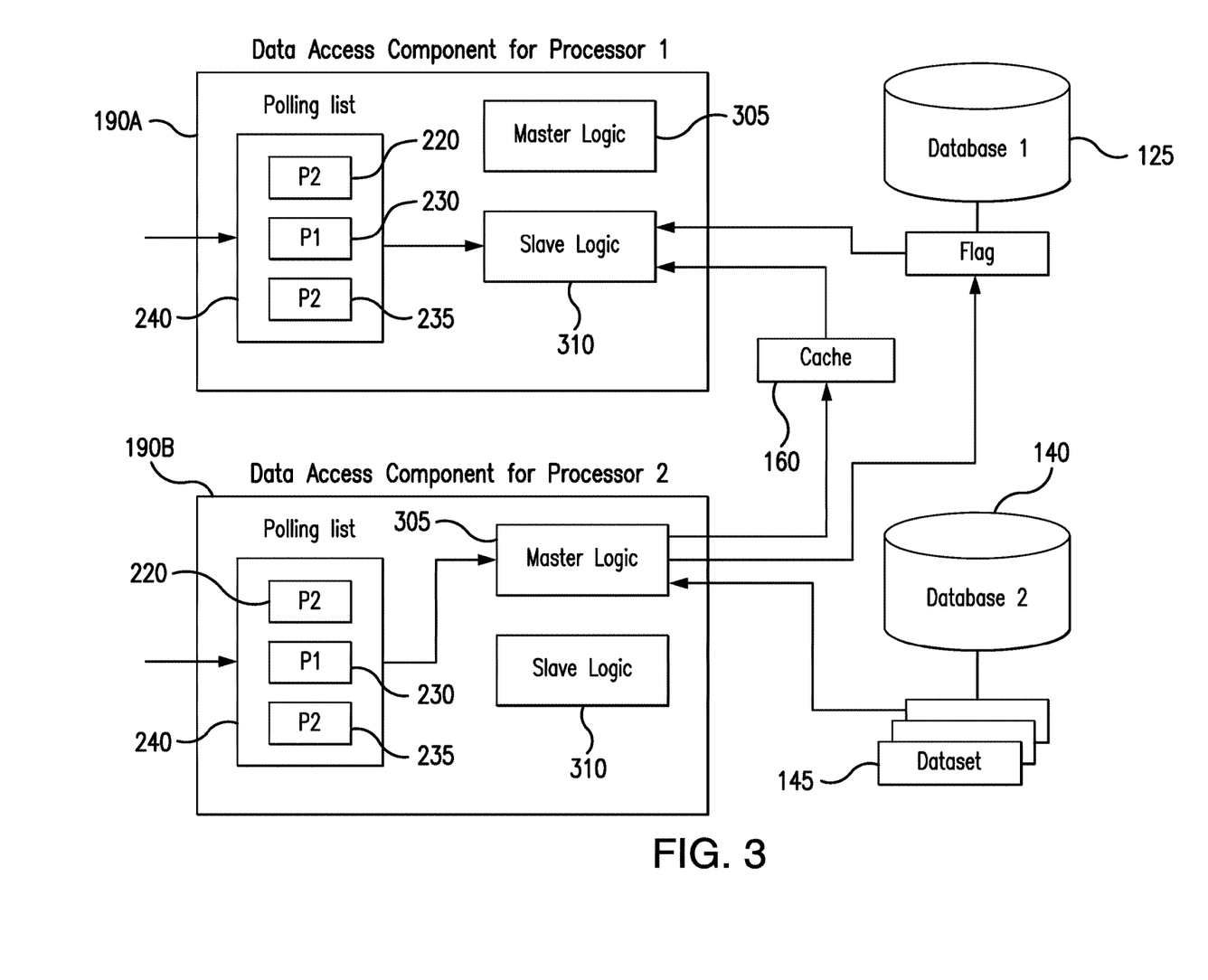
FIG. 3 illustrates the data access component of the data access tool of the system of FIG. 1.

FIG. 3 presents an example illustrating the operation of data access components 170A and 170B of data access tool 105. While, for simplicity, FIG. 3 omits the operation of data access component 170C, this disclosure contemplates that data access component 170C operates in a similar manner to data access component 170A, given that in the example illustrated in FIGS. 2 and 3, both first processor 150A and third processor 150C will be slave processors. Additionally, this disclosure contemplates that any number of additional data access components may be included system 100, with each additional data access component operating in a similar manner to data access component 170A (assuming that second processor 150B remains the master processor).

As can be seen in FIG. 3, data access component 170A of first component 105A of data access tool 105 accesses polling list 185 stored in first database 125. Data access component 170A determines that identifier P1, assigned to first processor 150A, appears once in polling list 185 (as second element 230), while identifier P2, assigned to second processor 150B, appears twice (as first element 220 and third element 235). Accordingly, data access component 170A determines that first processor 150A is a slave processor and executes slave logic 310.

Slave logic 310 consists of a set of instructions directing the slave processor to wait for the master processor to finish updating cache 160, and to read data stored in cache 160, in response to determining that the master processor has finished updating cache 160. Determining that the master has finished updating cache 160 consists of determining that the master processor has updated the value for flag 135. For example, in certain embodiments, the master processor updates the value for flag 135 from FALSE to TRUE after it has finished updating cache 160. In other embodiments, the master processor updates the value for flag 135 from 0 to 1 after it has finished updating cache 160. In certain embodiments, waiting for the master processor to finish updating cache 160 includes accessing first database 125 and monitoring the value for flag 135, by determining the value for flag 135 at regular intervals. In other embodiments, waiting for the master processor to finish updating cache 160 includes waiting to receive a message, broadcasted to the slave processor from the master processor, indicating that the master processor has updated the value for flag 135.

As can be seen in FIG. 3, data access component 170B of second component 105B of data access tool 105 similarly accesses polling list 185 stored in first database 125. Data access component 170B determines that identifier P2, assigned to second processor 150B, appears twice in polling list 185 (as first element 220 and third element 235), which is more than any other identifier stored in polling list 185. Accordingly, data access component 170B determines that second processor 150B is the master processor and executes master logic 305. Master logic 105 consists of a set of instructions directing the master processor to access second database 140, copy dataset 145 stored in second database 140 into cache 160, and update flag 135 in response to finishing copying dataset 145 into cache 160.

In certain embodiments, data access components 170A through 170C first determine that a set time interval has passed since polling component 165A through 165C were last invoked, prior to accessing polling list 185. This helps to ensure that all of the processors 150A through 150C have cast their votes for the master processor (by storing an identifier assigned to one of the processors 150A through 150C in polling list 185) before data access components 170A through 170C access polling list 185 to determine the results of the voting process.

Figure 4:
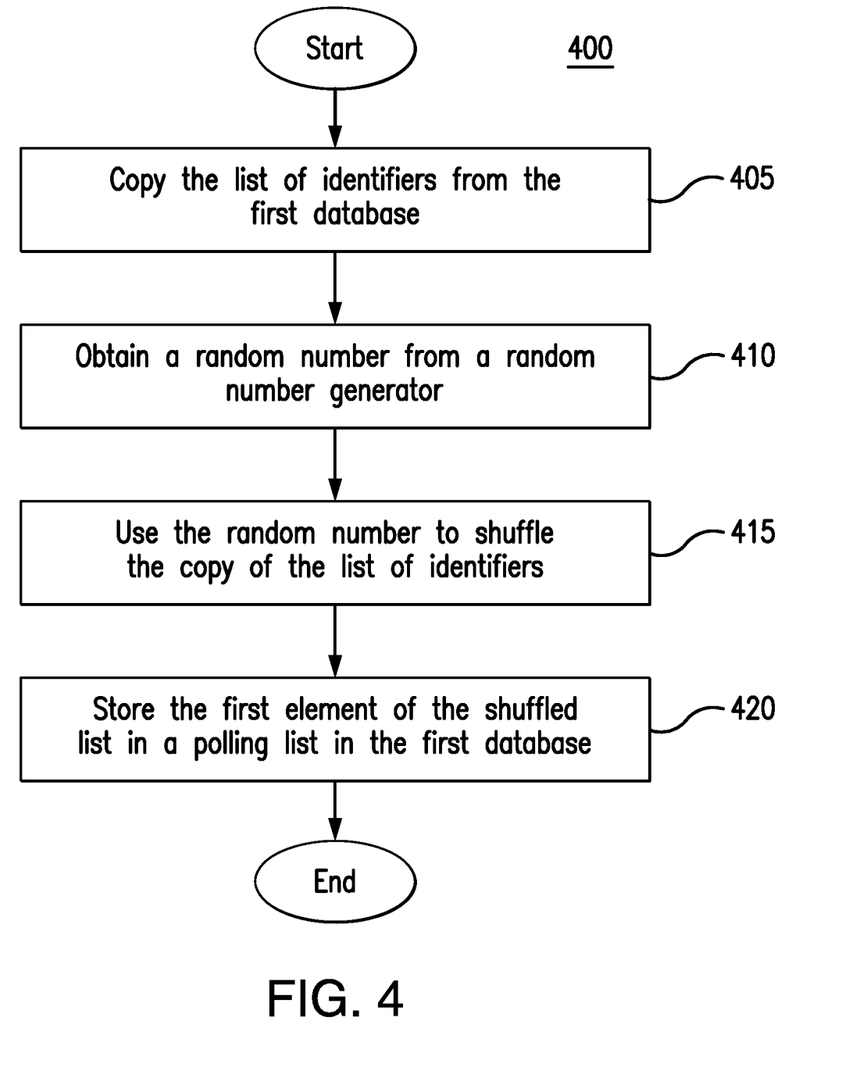
FIG. 4 presents a flowchart illustrating the process by which a processor of the data access tool of the system of FIG. 1 makes its selection for the master processor.

FIG. 4 presents a flowchart illustrating the process by which a processor 150 of data access tool 105 makes its selection for the master processor. In step 405, the processor copies the list of identifiers 130 from first database 125 into memory 155. In step 410, the processor obtains one or more random numbers 210 using a random number generator 205. In step 415, the processor uses the one or more random numbers 210 to shuffle the copy of the list of identifiers 130 stored in memory 155. Finally, in step 420, the processor stores the first element of the shuffled list in a polling list 185 stored in first database 125. This first element contains an identifier of the list of identifiers 130 and corresponds to the processor's vote for the master processor.

Modifications, additions, or omissions may be made to method 400 depicted in FIG. 4. Method 400 may include more, fewer, or other steps. For example, steps may be performed in parallel or in any suitable order. While discussed as a processor 150 of data access tool 105 performing the steps, any suitable component of system 100, such as device(s) 115 for example, may perform one or more steps of the method.

Figure 5:
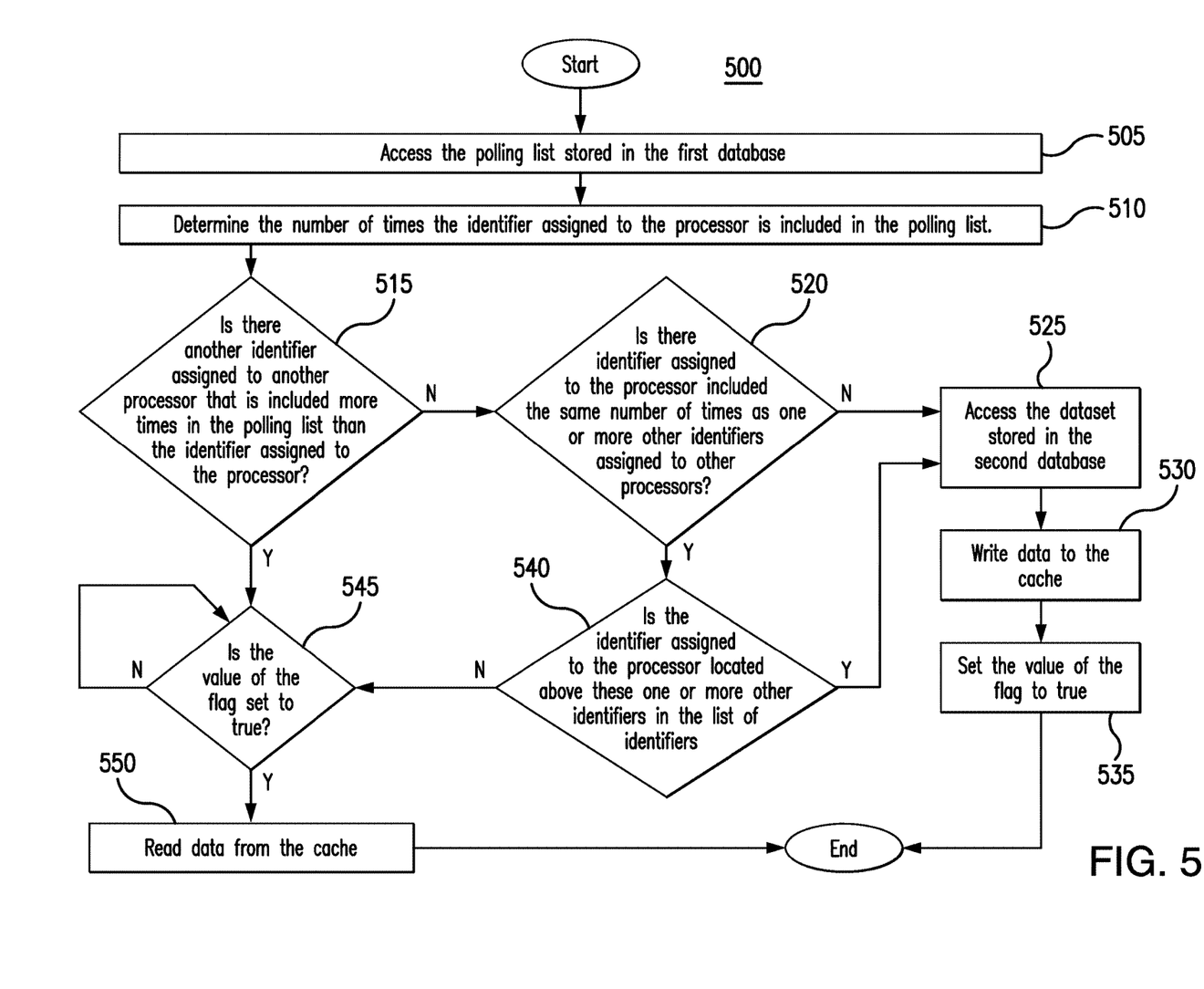
FIG. 5 presents a flowchart illustrating the process by which a processor of the data access tool of the system of FIG. 1 determines if it is the master processor or a slave processor and accesses data based on the determination.

FIG. 5 presents a flowchart illustrating the process by which a processor of data access tool 105 determines whether it is the master processor, or a slave processor, and accesses data based on this determination. In step 505, the processor accesses polling list 185 stored in first database 125. In step 510, the processor determines the number of times its assigned identifier is included in polling list 185. In step 515, the processor determines if there is another identifier, assigned to a different processor, that is included more times in polling list 185 than its assigned identifier. If the processor determines that there is not another identifier that is included more times in polling list 185 than its assigned identifier, then in step 520, the processor next determines if its assigned identifier is included the same number of times as one or more other identifiers. If the processor determines that its assigned identifier is not included the same number of times as one or more other identifiers, then in step 525, the processor accesses dataset 145 stored in second database 125. The processor next copies dataset 145 into cache 160, in step 530. Finally, in step 535, the processor sets the value for flag 135 to TRUE.

If, in step 520, the processor determines that its assigned identifier is included the same number of times as one or more other identifiers, then in step 540, the processor next determines if its assigned identifier is located above the one or more other identifiers in the list of identifiers 130. If the processor determines that its assigned identifier is located above the one or more other identifiers in the list of identifiers 130, then in step 525, the processor accesses dataset 145 stored in second database 125. The processor next copies dataset 145 into cache 160, in step 530. Finally, in step 535, the processor sets the value for flag 135 to TRUE.

If, on the other hand, the processor determines that its assigned identifier is not located above the one or more other identifiers in the list of identifiers 130, then in step 545, the processor determines whether the value for flag 135 is set to TRUE. If the processor determines that the value for flag 135 is set to TRUE, then in step 550, the processor reads dataset 145 from cache 160.

If, in step 515, the processor determines that there is another identifier that is included in polling list 185 more times than its assigned identifier, then in step 545, the processor determines if the value for flag 135 is set to TRUE. If the processor determines that the value for flag 135 is set to TRUE, then in step 550, the processor reads dataset 145 from cache 160. If the processor determines that the value for flag 135 is not set to TRUE, it continues to monitor the value for the flag until it determines that the value for the flag is set to TRUE.

Modifications, additions, or omissions may be made to method 500 depicted in FIG. 5. Method 500 may include more, fewer, or other steps. For example, steps may be performed in parallel or in any suitable order. While discussed as a processor 150 of data access tool 105 (or components thereof) performing the steps, any suitable component of system 100, such as device(s) 115 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:
1. An apparatus comprising:
a first database configured to store:
  a first list of identifiers comprising a first identifier and a second identifier; and
  a flag;
a second database configured to store a dataset;
a first memory;
a second memory;
a third memory;
a first hardware processor, assigned to the first identifier, communicatively coupled to the first memory and the second memory, and configured to:
  copy the first list of identifiers from the first database into a second list of identifiers;
  store the second list of identifiers in the second memory;
  use a first random number to shuffle the second list of identifiers;
  in response to shuffling the second list of identifiers:
    determine a first entry of the second list of identifiers, the first entry comprising an identifier of the first list of identifiers; and
    store the first entry of the second list in a third list, the third list stored in the first database;
  determine that a time interval has passed;
  in response to determining that the time interval has passed:
    access the third list;
    determine that the first identifier appears a first number of times in the third list;
    determine that the second identifier appears a second number of times in the third list;
    determine that the first number is greater than the second number;
    in response to determining that the first number is greater than the second number:
      copy the dataset into a dataset copy;
      store the dataset copy in the first memory; and
      in response to storing the dataset copy in the first memory, set a value for the flag to true;
a second hardware processor, assigned to the second identifier, communicatively coupled to the first memory and the third memory, and configured to:
  copy the first list of identifiers from the first database into a fourth list of identifiers;
  store the fourth list of identifiers in the third memory;
  use a second random number to shuffle the fourth list of identifiers;
  in response to shuffling the fourth list of identifiers:
    determine a first entry of the fourth list of identifiers, the first entry of the fourth list comprising an identifier of the first list of identifiers; and
    store the first entry of the fourth list in the third list, the third list stored in the first database;
  determine that the time interval has passed;
  in response to determining that the time interval has passed:
    access the third list;
    determine that the first identifier appears the first number of times in the third list;
    determine that the second identifier appears the second number of times in the third list;
    determine that the first number is greater than the second number; and
    in response to determining that the first number is greater than the second number:
      determine that the value for the flag is set to true;
      in response to determining that the value for the flag is set to true, access the dataset copy stored in the first memory.
2. The apparatus of claim 1, wherein:
the first processor is further configured to:
  copy the first list of identifiers from the first database into a fifth list of identifiers;
  store the fifth list of identifiers in the second memory;
  use a third random number to shuffle the fifth list of identifiers;
  in response to shuffling the fifth list of identifiers:
    determine a first entry of the fifth list of identifiers, the first entry of the fifth list comprising an identifier of the first list of identifiers; and
    store the first entry of the fifth list in a sixth list, the sixth list stored in the first database;
  determine that a second time interval has passed;
  in response to determining that the second time interval has passed:
    access the sixth list;
    determine that the first identifier appears a third number of times in the sixth list;
    determine that the second identifier appears a fourth number of times in the sixth list;
    determine that the third number is equal to the fourth number;
    in response to determining that the third number is equal to the fourth number:
      determine that the first identifier appears before the second identifier in the first list of identifiers; and
      in response to determining that the first identifier appears before the second identifier in the first list of identifiers:
        copy the dataset into the dataset copy;
        store the dataset copy in the first memory; and
        in response to storing the dataset copy in the first memory, set the value for the flag to true; and
the second processor is further configured to:
  copy the first list of identifiers from the first database into a seventh list of identifiers;
  store the seventh list of identifiers in the third memory;
  use a fourth random number to shuffle the seventh list of identifiers;
  in response to shuffling the seventh list of identifiers:
    determine a first entry of the seventh list of identifiers, the first entry of the seventh list comprising an identifier of the first list of identifiers; and
    store the first entry of the seventh list in the sixth list, the sixth list stored in the first database;
  determine that the second time interval has passed;
  in response to determining that the second time interval has passed:
    access the sixth list;
    determine that the first identifier appears the third number of times in the sixth list;
    determine that the second identifier appears the fourth number of times in the sixth list;
    determine that the third number is equal to the fourth number; and in response to determining that the third number is
   equal to the fourth number:
   determine that the first identifier appears before
      the second identifier in the first list of identifi-
      ers; and
   in response to determining that the first identifier
      appears before the second identifier in the first
      list of identifiers:
      determine that the value for the flag is set to
         true; and
      in response to determining that the value for the
         flag is set to true, access the dataset copy stored
         in the first memory.

3. The apparatus of claim 1, wherein the first list of identifiers contains identifiers assigned to a set of external processors and a set of cloud-based processors.

4. The apparatus of claim 1, wherein determining that the value for the flag is set to true comprises accessing the first database and monitoring the value for the flag.

5. The apparatus of claim 1, wherein determining that the value for the flag is set to true comprises receiving a message from the first hardware processor, the message indicating that the value for the flag is set to true.

6. The apparatus of claim 1, wherein the first memory is a distributed cache.

7. The apparatus of claim 1, wherein the first processor is further:
   communicatively coupled to the second processor; and
   configured to cooperate with the second processor to
      execute an application, the application configured to
      operate on the dataset.

8. A method comprising:
   performing using a first hardware processor:
      copying a first list of identifiers from a first database
         into a second list of identifiers, the first list of
         identifiers comprising a first identifier assigned to the
         first hardware processor and a second identifier
         assigned to a second hardware processor;
      storing the second list of identifiers in a second
         memory, the first processor communicatively
         coupled to the second memory and a first memory;
      using a first random number to shuffle the second list of
         identifiers;
      in response to shuffling the second list of identifiers:
         determining a first entry of the second list of identifiers,
            the first entry comprising an identifier of the first list
            of identifiers; and
         storing the first entry of the second list of identifiers in
            a third list, the third list stored in the first database;
      determining that a time interval has passed;
      in response to determining that the time interval has
         passed:
         accessing the third list;
         determining that the first identifier appears a first
            number of times in the third list;
         determining that the second identifier appears a
            second number of times in the third list;
         determining that the first number is greater than the
            second number;
         in response to determining that the first number is
            greater than the second number:
            copying the dataset into a dataset copy;
            storing the dataset copy in the first memory; and
            in response to storing the dataset copy in the first
               memory, setting a value for a flag to true, the
               flag stored in the first database;
   performing using the second hardware processor:
      copying the first list of identifiers from the first data-
         base into a fourth list of identifiers;
      storing the fourth list of identifiers in a third memory,
         the second processor communicatively coupled to
         the first memory and the third memory;
      using a second random number to shuffle the fourth list
         of identifiers;
      in response to shuffling the fourth list of identifiers:
         determining a first entry of the fourth list of identifiers,
            the first entry of the fourth list comprising an
            identifier of the first list of identifiers; and
         storing the first entry of the fourth list in the third list,
            the third list stored in the first database;
      determining that the time interval has passed;
      in response to determining that the time interval has
         passed:
         accessing the third list;
         determining that the first identifier appears the first
            number of times in the third list;
         determining that the second identifier appears the
            second number of times in the third list;
         determining that the first number is greater than the
            second number; and
         in response to determining that the first number is
            greater than the second number:
            determining that the value for the flag is set to true;
            in response to determining that the value for the
               flag is set to true, accessing the dataset copy
               stored in the first memory.

9. The method of claim 8, further comprising:
   further performing with the first processor:
      copying the first list of identifiers from the first data-
         base into a fifth list of identifiers;
      storing the fifth list of identifiers in the second memory;
      using a third random number to shuffle the fifth list of
         identifiers;
      in response to shuffling the fifth list of identifiers:
         determining a first entry of the fifth list of identifiers,
            the first entry of the fifth list comprising an
            identifier of the first list of identifiers; and
         storing the first entry of the fifth list in a sixth list, the
            sixth list stored in the first database;
      determining that a second time interval has passed;
      in response to determining that the second time interval
         has passed:
         accessing the sixth list;
         determining that the first identifier appears a third
            number of times in the sixth list;
         determining that the second identifier appears a
            fourth number of times in the sixth list;
         determining that the third number is equal to the
            fourth number;
         in response to determining that the third number is
            equal to the fourth number:
            determining that the first identifier appears before
               the second identifier in the first list of identifi-
               ers; and
            in response to determining that the first identifier
               appears before the second identifier in the first
               list of identifiers:
               copying the dataset into the dataset copy;
               storing the dataset copy in the first memory; and
               in response to storing the dataset copy in the
                  first memory, setting the value for the flag to
                  true; and
   further performing with the second processor:

copying the first list of identifiers from the first database into a seventh list of identifiers;
storing the seventh list of identifiers in the third memory;
using a fourth random number to shuffle the seventh list of identifiers;
in response to shuffling the seventh list of identifiers:
determining a first entry of the seventh list of identifiers, the first entry of the seventh list comprising an identifier of the first list of identifiers; and
storing the first entry of the seventh list in the sixth list, the sixth list stored in the first database;
determining that the second time interval has passed;
in response to determining that the second time interval has passed:
accessing the sixth list;
determining that the first identifier appears the third number of times in the sixth list;
determining that the second identifier appears the fourth number of times in the sixth list;
determining that the third number is equal to the fourth number; and
in response to determining that the third number is equal to the fourth number:
determining that the first identifier appears before the second identifier in the first list of identifiers; and
in response to determining that the first identifier appears before the second identifier in the first list of identifiers:
determining that the value for the flag is set to true; and
in response to determining that the value for the flag is set to true, accessing the dataset copy stored in the first memory.

10. The method of claim 8, wherein the first list of identifiers contains identifiers assigned to a set of external processors and a set of cloud-based processors.

11. The method of claim 8, wherein determining that the value for the flag is set to true comprises accessing the first database and monitoring the value for the flag.

12. The method of claim 8, wherein determining that the value for the flag is set to true comprises receiving a message from the first hardware processor, the message indicating that the value for the flag is set to true.

13. The method of claim 8, wherein the first memory is a distributed cache.

14. The method of claim 8, further comprising:
further performing with the first processor, executing an application cooperatively with the second processor, the application configured to operate on the dataset.

15. A system comprising:
a first storage element operable to store:
a first list of identifiers comprising a first identifier and a second identifier; and
a flag;
a second storage element operable to store a dataset;
a third storage element comprising a distributed cache;
a fourth storage element;
a fifth storage element;
a first processing element, assigned to the first identifier, communicatively coupled to the third storage element and the fourth storage element, and operable to:
copy the first list of identifiers from the first storage element into a second list of identifiers;
store the second list of identifiers in the fourth storage element;
use a first random number to shuffle the second list of identifiers;
in response to shuffling the second list of identifiers:
determine a first entry of the second list of identifiers, the first entry comprising an identifier of the first list of identifiers; and
store the first entry of the second list in a third list, the third list stored in the first storage element;
determine that a time interval has passed;
in response to determining that the time interval has passed:
access the third list;
determine that the first identifier appears a first number of times in the third list;
determine that the second identifier appears a second number of times in the third list;
determine that the first number is greater than the second number;
in response to determining that the first number is greater than the second number:
copy the dataset into a dataset copy;
store the dataset copy in the third storage element; and
in response to storing the dataset copy in the third storage element, set a value for the flag to true;
a second hardware processor, assigned to the second identifier, communicatively coupled to the third storage element and the fifth storage element, and configured to:
copy the first list of identifiers from the first storage element into a fourth list of identifiers;
store the fourth list of identifiers in the fifth storage element;
use a second random number to shuffle the fourth list of identifiers;
in response to shuffling the fourth list of identifiers:
determine a first entry of the fourth list of identifiers, the first entry of the fourth list comprising an identifier of the first list of identifiers; and
store the first entry of the fourth list in the third list, the third list stored in the first storage element;
determine that the time interval has passed;
in response to determining that the time interval has passed:
access the third list;
determine that the first identifier appears the first number of times in the third list;
determine that the second identifier appears the second number of times in the third list;
determine that the first number is greater than the second number; and
in response to determining that the first number is greater than the second number:
determine that the value for the flag is set to true;
in response to determining that the value for the flag is set to true, access the dataset copy stored in the third storage element.

16. The system of claim 15, wherein:
the first processing element is further operable to:
copy the first list of identifiers from the first storage element into a fifth list of identifiers;
store the fifth list of identifiers in the fourth storage element;
use a third random number to shuffle the fifth list of identifiers;
in response to shuffling the fifth list of identifiers:

determine a first entry of the fifth list of identifiers, the first entry of the fifth list comprising an identifier of the first list of identifiers; and
store the first entry of the fifth list in a sixth list, the sixth list stored in the first storage element;
determine that a second time interval has passed;
in response to determining that the second time interval has passed:
 access the sixth list;
 determine that the first identifier appears a third number of times in the sixth list;
 determine that the second identifier appears a fourth number of times in the sixth list;
 determine that the third number is equal to the fourth number;
 in response to determining that the third number is equal to the fourth number:
  determine that the first identifier appears before the second identifier in the first list of identifiers; and
  in response to determining that the first identifier appears before the second identifier in the first list of identifiers:
   copy the dataset into the dataset copy;
   store the dataset copy in the third storage element; and
   in response to storing the dataset copy in the third storage element, set the value for the flag to true; and
the second processing element is further operable to:
 copy the first list of identifiers from the first storage element into a seventh list of identifiers;
 store the seventh list of identifiers in the fifth storage element;
 use a fourth random number to shuffle the seventh list of identifiers;
 in response to shuffling the seventh list of identifiers:
  determine a first entry of the seventh list of identifiers, the first entry of the seventh list comprising an identifier of the first list of identifiers; and
  store the first entry of the seventh list in the sixth list, the sixth list stored in the first storage element;
 determine that the second time interval has passed;
 in response to determining that the second time interval has passed:
  access the sixth list;
  determine that the first identifier appears the third number of times in the sixth list;
  determine that the second identifier appears the fourth number of times in the sixth list;
  determine that the third number is equal to the fourth number; and
  in response to determining that the third number is equal to the fourth number:
   determine that the first identifier appears before the second identifier in the first list of identifiers; and
   in response to determining that the first identifier appears before the second identifier in the first list of identifiers:
    determine that the value for the flag is set to true; and
    in response to determining that the value for the flag is set to true, access the dataset copy stored in the third storage element.

17. The system of claim 15, wherein the first list of identifiers contains identifiers assigned to a set of external processors and a set of cloud-based processors.

18. The system of claim 15, wherein determining that the value for the flag is set to true comprises accessing the first storage element and monitoring the value for the flag.

19. The system of claim 15, wherein determining that the value for the flag is set to true comprises receiving a message from the first processing element, the message indicating that the value for the flag is set to true.

20. The system of claim 15, wherein the first processing element is further:
 communicatively coupled to the second processing element; and
 operable to cooperate with the second processing element to execute an application, the application configured to operate on the dataset.

* * * * *